Feb. 7, 1961   W. L. CARLSON, JR., ET AL   2,971,129
TEMPERATURE RESPONSIVE CURRENT CONTROL
Filed Feb. 7, 1958

INVENTORS
WILLIAM L. CARLSON, JR.
JOHN W. MOBARRY
BY Joseph E. Ryan
ATTORNEY

United States Patent Office 2,971,129
Patented Feb. 7, 1961

2,971,129

TEMPERATURE RESPONSIVE CURRENT CONTROL

William L. Carlson, Jr., Bloomington, and John W. Mobarry, Edina, Minn., assignors to Minneapolis-Honeywell Regulator Company, Minneapolis, Minn., a corporation of Delaware Filed Feb. 7, 1958, Ser. No. 713,927

8 Claims. (Cl. 317—13)

The present application is directed to a temperature responsive current control device, and more specifically to a device particularly adapted for use as motor overload protection equipment.

In normal operation electric motors are heated to a stable operating temperature by the normal current flowing within the motors during their operation. If an abnormal condition occurs effecting the load on the motor, or the atmosphere around the motor, the temperature of the unit changes substantially. If for some reason an electric motor is overloaded an increase of supply current occurs with a resultant increase in the temperature of the motor. Many different types of motor overload protection devices are available on the market which sense one or the other of these conditions, or a possible combination of these conditions. The response time and range of operation of these overloads may be inadequate in certain types of applications, such as exist when a motor is used in a hermetically sealed cooling or air conditioning system. In such systems the cooling or air conditioning media is caused to flow across the motor itself thereby resulting in an abnormal degree of cooling which allows for the motor to be operated at a higher current than would otherwise exist. If for some reason the coolant is lost the motor temperature rises substantially and this change may not be reflected in a change of the motor current. In order to protect such equipment it is necessary to both sense the current applied and the temperature contained within the device. Basically however, the temperature rise of the motor is the most critical element, and abnormal temperatures must be protected against in order to provide a mode of operation which will not permanently damage the insulating material used in manufacturing the electric motors.

The present invention is directed to a thermal overload unit which is placed within a device, such as an electric motor, and senses the heat contained within the unit. The unit further is activated by the current flowing through the unit and thereby provides a type of motor overload protection which is capable of use in hermetically sealed systems, as well as generally in connection with electric equipment. The principle of operation of the presently proposed device can best be understood when an understanding of liquid metal pumps of the electromagnetic or Faraday type is understood. The Faraday type electromagnetic pump operates on the principle of a magnetic field transversing a column of a liquid conductor while an electric current is caused to flow across the conductive fluid at right angles to the magnetic field. There is an interaction of the magnetic field and the current which yields a force within the conductive fluid which is mutually perpendicular to both the current and the magnetic field. This force in turn moves the conductive fluid in a manner quite similar to that of a conventional pump. The Faraday electromagnetic type pump is utilized in the present invention in connection with a conductive material which becomes a fluid at a control temperature. It is apparent that a conductive material would remain fixed under the influence of an electric current and a magnetic field whereas a conductive fluid would be caused to move. It is further obvious therefore, that if the point at which a conductive material melted was the critical temperature at which a device was to be controlled, that a control function could be evolved from the movement of the material when it becomes a fluid.

To further understand the present invention, it is necessary to appreciate that whenever an electric current flows in a conductor, there is generated a resultant magnetic field. If the resultant magnetic field is properly utilized this field can be combined with the current which creates it to provide a pumping function along the principles of a Faraday pump. It will thus be appreciated, that as the current to a motor is conducted through the device which is described in detail below that a magnetic field can be established across a conductive material while the same current passes through that material. Upon a change of state of the material from a solid state to a fluid state there is a pumping action which then moves the fluid in a manner which will provide adequate opportunity for control. The control function can be utilized in many ways, but one simplified method is shown in the present specific disclosure contained below.

The principles set out above can be applied in many ways but the main principle or object of the present invention is to disclosed a thermal current overload protection device that is capable of being located within and in a heat exchange relation with the device to be protected thereby being capable of a fast response in control of the current flowing through it.

A further object is to disclose an automatic thermal current overload protection device which has a reset arrangement that is substantially automatic and which does not deteriorate or change calibration in used.

A still further object is to disclose an exceedingly simple and inexpensive current control device that has a single moving part in the form of a fluid, and is built of readily available materials.

Yet another object is to disclose a control device and circuit which requires no additional power source other than that utilized to operate the device being protected.

A further object of the present arrangement is to disclose a thermal overload device which is sensitive to both heat and the magnitude of current flowing through the device.

These and other objects will become apparent when the single sheet of drawings is considered with the following specification. In the drawings.

Figure 1:
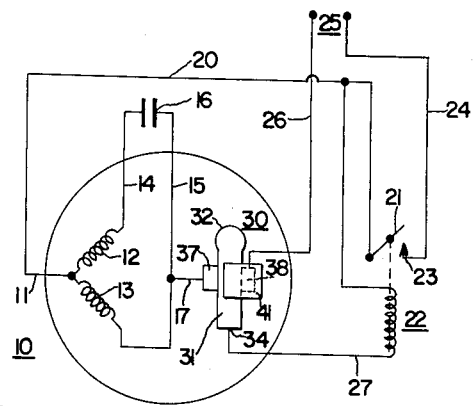
Figure 1 is a schematic representation of an electric motor utilizing the thermal overload protection device in a system which automatically shuts down the motor upon the occurrence of a thermal overload.

A motor is schematically represented at 10 as having an input lead or conductor 11 to energizing windings 12 and 13. Energizing windings 12 and 13 are in turn connected through leads 14 and 15 to an external capacitor 16. The windings 12 and 13 operate with the phase shifting condenser 16 in a manner well known in the motor art. The conductor 15 forms part of the output circuit to the conductor 17 which is in turn connected to the current control device generally shown at 30. Conductor 11 is connected through a conductor 20 to an armature and contact 21 of relay or current control means 22. The relay 22 has open contacts 21 and 23 when the relay 22 is deenergized. Upon energization of relay 22 the armature and contact 21 closes thereby completing a circuit with contact 23 to a conductor 24 which is connected to a current source 25. Current source 25 is in turn connected by means of conductor 26 back through the current control 30 and is operated in a manner which will become apparent below. A circuit is completed through the relay 22 by means of conductor 27 to an additional terminal of the current control device 30.

From the schematic representation disclosed in Figure 1 it is apparent that to operate the motor 10 a current source is supplied at 25 and the armature and contact 21 is manually closed. Upon closing of the armature 21 a complete circuit is formed from the source 25 through the relay 22 to the current control device 30 and then back to conductor 26 to return to the current source 25. If a path is completed through the current control device 30 the relay 22 will remain in an energized or closed position. It is further apparent that after the armature and contact 21 has closed that power is supplied from the source 25 through conductors 24, 20 and 11 to the input of motor 10. Current flows in motor 10 through windings 12 and 13 and the phase of the current flowing in the two windings is shifted by means of the condenser 16. The shifted phase of the flowing current provides the necessary starting and run characteristics for the motor. The current then returns to the current control device 30 through conductors 15 and 17. It is further apparent that if the current control device 30 conducts current that a completed path is formed from the conductor 17 to the conductor 26 and thence back to the supply 25. If for some reason, such as a temperature overload condition, the current control device 30 becomes an open circuit, the power to the motor 10 is disrupted as is the power to conductor 27 and relay 22. With this arrangement any disruption of the circuit through the current control device 30 shuts the motor down and allows the relay 22 to open to thereby keep the motor out of operation. After a proper time has been allowed for the motor 10 to cool the armature and contact 21 can be closed to reactivate the motor. This operation can be repeated at will, and the motor 10 will operate only if the temperature has dropped so as to in effect reset the current control device 30.

Figure 2:
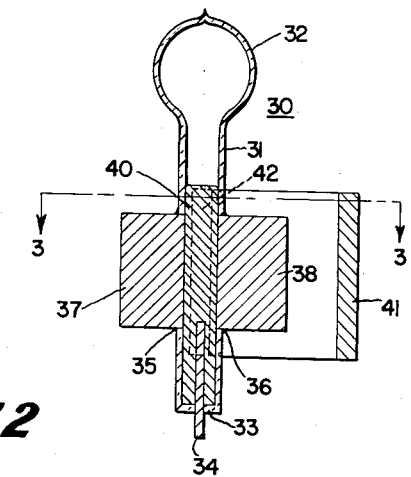
Figure 2 is a cross section of the thermal overload device itself.
Figure 3:
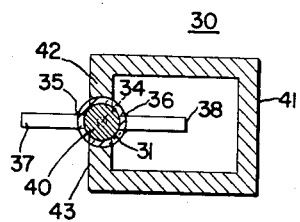
Figure 3 is a cross section of Figure 2 along lines 3—3.

The current control device 30 is shown in detail in Figures 2 and 3. The current control device 30 is formed of a tubular member 31 of an insulating material such as porcelain, or glass, or high resistance steel. The tubular member 31 has an extension in the form of a bulb 32, the purpose of which will become apparent as an explanation of the operation of the device is concluded. The tube 31 has a closed bottom end 33 through which is placed a contact for conductor 34. The conductor 34 is sealed in a fluid tight manner to the bottom 33. Slots 35 and 36 are provided in diametrically opposite sides of the tube 31 and into slots 35 and 36 are placed two electrodes 37 and 38. The two electrodes 37 and 38 are sealed in a fluid tight manner into the tube 31.

Prior to the completion of forming the bulb 32 a material in the form of a liquid is poured into the device and solidified as the conductive material 40. The material 40 is characterized by being a good conductor both in its solid and liquid or fluid states. The melting point or point at which the material 40 has a change of state to a fluid is the temperature at which the control device is to be utilized. The material 40 in the common case would be some form of metal, probably most generally a form of solder. The metal would be a solid conductive material below the control temperature whereas it would be a free and normal liquid above the control temperature. In certain applications where the device is to be used at low temperatures material such as mercury and other conductive liquid metals such as sodium, potassium, or a sodium-potassium mixture could be used. In addition to the group of metals many other types of materials might be used which change from a solid state to a fluid state at a desirable temperature and wherein the material has a conductive nature at both of its states. In the present application the conductive material 40 will be considered as a form of solder, as solder has a melting temperature which can be utilized in the range most likely to be commonly placed in use in motor control applications.

Adjacent to the tube 31 is a closed magnetic structure 41 which is C-shaped. The open legs of the C-shaped magnetic structure 41, that is legs 42 and 43, are placed at the same level as electrodes 37 and 38 but are at right angles to those electrodes.

In operation the conductor 34 is attached to the conductor 27 of Figure 1 while the electrode 38 is connected to conductor 26. The electrode 37 then in turn is connected to the output of the motor 10 which is on conductor 17. When operated in the manner described above the entire current flowing through the motor 10 passes from electrode 37 to electrode 38 through the conductive solid material 40. As the current passes from electrode 37 to electrode 38 a magnetic field is established and is readily conducted by the magnetic structure 41 so as to be at right angles to the flow of current. The self-induced magnetic field established across the solid conductive material 40 cooperates with the current flowing between electrodes 37 and 38 to provide a force within the conductive material 40.

At the same time a control circuit is completed by means of the circuit passing between the contact 34 and the electrode 38 so as to provide the necessary power to the current control means or relay 22. It will be obvious from this arrangement that as long as the conductive material 40 remains in the location disclosed in Figure 2 that both the motor circuit and the control circuit are completed. If for some reason the motor 10 becomes overheated, the heat is transferred to the control device 30 as the device 30 has been placed in a heat exchange relationship with the motor 10 so that this motor heat transfer can be readily accomplished. As the motor temperature rises to the melting point of the conductive material 40, the conductive material changes from its solid state to a liquid or fluid state. The interaction of the electric current passing between electrodes 37 and 38 when influenced by the magnetic field established in the magnetic structure 41 then becomes a Faraday or electromagnetic type of pump. The pumping action or force which is created within the material 40 causes the material to be pumped in an upward direction thereby disrupting the current path between electrodes 37 and 38 as well as the current path between the conductor 34 and the electrode 38. It is thus apparent that as soon as the critical temperature is reached the change of state of the conductive material 40 from a solid to a fluid allows the fluid to be moved under the electromagnetic action so as to disrupt both the control circuit and the main current circuit. With this arrangement the controlled device is immediately disconnected from the power source 25 by the opening of the current control means or relay 22 by the opening of the circuit from the conductor 34 to electrode 38. As soon as this phenomena has occurred, the conductive material 40 is no longer subjected to any type of force and flows back to the position shown in Figure 2. As soon as the temperature of the motor 10 and the control device 30 drops to the solidification temperature of the material 40, the device becomes automatically reset and is ready to be placed back in operation.

It is obvious from the above discussion that an unusual type of control device has been provided and that this control device can be utilized in any unit which requires a temperature protection element in conjunction with a current overload. The present device is by no means limited solely to application of electric motors but is applicable to any electromagnetic or electrical device having a temperature problem. It will be further noted that the magnetic structure 41 can be made of a permanent magnetic material or may have a magnetic energizing circuit associated therewith. These choices are a matter of design and in no way avoid the intent and scope of the present invention. Also, the control circuit through conductor 34 can be eliminated and the device 30 will operate as a current limiting device of a proportional type by pumping enough fluid 40 from between electrodes 37 and 38 to limit the current to a safe value. Due to many possible modifications of the present invention the applicants wish to be limited in the scope of their invention only by the appended claims.

We claim as our invention:

1. A temperature responsive current control device; container means enclosing a solid conductive material which becomes a fluid at a control temperature; electrode means conducting a current to be controlled through said conductive material; magnetic circuit means having a magnetic field adjacent said container means and said conductive material; said magnetic field passing across said conductive material perpendicular to said current and thereby creating a force mutually perpendicular to said current and said field within said conductive material; and said conductive material undergoing a change of state to said fluid at said control temperature; said force within said fluid moving said fluid to disrupt said current passing between said electrode means.

2. A temperature responsive current control device; container means enclosing a solid conductive material which becomes a fluid at a control temperature; electrode means conducting a current to be controlled through said conductive material; magnetic circuit means having a magnetic field adjacent said container means and said conductive material; said magnetic field passing across said conductive material perpendicular to said current and thereby creating a force mutually perpendicular to said current and said field within said conductive material; and current control means having a control circuit passing through said conductive material; said conductive material undergoing a change of state to said fluid at said control temperature and said fluid being subjected to said force; said force within said fluid moving said fluid to disrupt said current and said control circuit.

3. A temperature responsive current control unit: A device to be controlled; container means in a heat exchange relationship with said device and enclosing a solid conductive material which becomes a liquid at a control temperature; electrode means conducting a current to be controlled through said conductive material; magnetic circuit means adjacent said container means and said conductive material; magnetic field generating means creating a magnetic field in said magnetic circuit means across said conductive material perpendicular to said current; said current and said magnetic field creating a force mutually perpendicular to said current and said field within said conductive material; and current control means having a control circuit passing through said conductive material; said conductive material liquifying when said device reaches said control temperature and said liquid being subjected to said force; said force within said liquid moving said liquid to disrupt said current and said control circuit; said disruption of said control circuit then in turn causing said current control means to deenergize said device.

4. A temperature responsive current control device: container means enclosing a solid conductive material which becomes a fluid at a control temperature; electrode means conducting a current to be controlled through said conductive material; magnetic circuit means adjacent said container means and said conductive material; and current creating a self-induced magnetic field in said magnetic circuit means across said conductive material perpendicular to said current; said current and said self-induced magnetic field creating a force mutually perpen- dicular to said current and said self-induced field within said conductive material; and current control means having a control circuit passing through said conductive material; said conductive material undergoing a change of state to said fluid at said control temperature and said fluid being subjected to said force; said force within said fluid moving said fluid to disrupt said current and said control circuit.

5. A temperature responsive current control device; container means enclosing a solid conductive material which becomes a liquid at a control temperature; electrode means conducting a current to be controlled through said conductive material; magnetic circuit means adjacent said container means and said conductive material; said current creating a self-induced magnetic field in said magnetic circuit means across said conductive material perpendicular to said current; said current and said self-induced magnetic field creating a force mutually perpendicular to said current and said self-induced field within said conductive material; and current control means having a control circuit passing through said conductive material; said conductive material liquifying at said control temperature and said liquid being subjected to said force; said force within said liquid moving said liquid to disrupt said current and said control circuit; said disruption of said control circuit then in turn causing said current control means to operate.

6. A temperature responsive current control device: container means enclosing a conductive metal which becomes a liquid metal at a control temperature; electrode means conducting a current to be controlled through said metal; magnetic circuit means adjacent said container means and said metal; magnetic field generating means creating a magnetic field in said magnetic circuit means across said metal perpendicular to said current; said current and said magnetic field creating a force mutually perpendicular to said current and said field within said metal; and relay means controlling said current and having an energized control circuit passing through said metal; said metal liquifying at said control temperature and said liquid metal being subjected to said force; said force within said liquid metal moving said liquid metal to disrupt said current and said energized control circuit; said energized control circuit then in turn opening to deenergize said relay means to in turn disconnect said current.

7. A temperature responsive current control unit: a device to be controlled; container means in a heat exchange relationship with said device and enclosing a conductive metal which becomes a liquid metal at a control temperature; electrode means conducting a current to be controlled through said metal; magnetic circuit means adjacent said container means and said metal; said current creating a self-induced magnetic field in said magnetic circuit means across said metal perpendicular to said current; said current and said self-induced magnetic field creating a force mutually perpendicular to said current and said self-induced field within said metal; and relay means controlling said current and having an energized control circuit passing through said metal; said metal liquifying when said device reaches said control temperature and said liquid metal being subjected to said force; said force within said liquid metal moving said liquid metal to disrupt said current and said energized control circuit; said energized control circuit then in turn opening to de-energize said relay means and to disconnect said current to said device.

8. A temperature responsive current control unit: a device to be controlled; an insulative container enclosing a conductive metal which becomes a liquid at a control temperature in a heat exchange relationship with said device; electrode means conducting a current to be controlled through said conductive metal; magnetic circuit means adjacent said container and said conductive metal; magnetic field generating means creating a magnetic field in said magnetic circuit means across said conductive metal perpendicular to said current; said current and said magnetic field creating a force mutually perpendicular to said current and said field within said conductive metal; and a relay having an energized control circuit passing through said conductive metal; said conductive metal liquifying when said device reaches said control temperature and said liquid metal being subjected to said force; said force within said liquid metal moving said liquid metal to disrupt said current and said energized control circuits; said energized control circuit thereby being open circuited to deenergize said relay; said relay in turn opening circuiting said electrode means to control said current to said device.

References Cited in the file of this patent

UNITED STATES PATENTS

| | | |
|---|---|---|
| 1,747,044 | Bainbridge | Feb. 11, 1930 |
| 2,158,009 | Hufnagel | May 9, 1939 |
| 2,464,340 | Newbill | Mar. 15, 1949 |
| 2,740,866 | Wappner | Apr. 3, 1956 |

FOREIGN PATENTS

| | | |
|---|---|---|
| 637,961 | Great Britain | May 31, 1950 |